United States Patent
Biswas et al.

(10) Patent No.: US 6,922,430 B2
(45) Date of Patent: Jul. 26, 2005

(54) METHOD AND APPARATUS FOR A MULTIBEAM BEACON LASER ASSEMBLY FOR OPTICAL COMMUNICATIONS

(75) Inventors: Abhijit Biswas, Arcadia, CA (US); Babak Sanji, Pasadena, CA (US); Malcolm W. Wright, Pasadena, CA (US); Norman Alan Page, Monrovia, CA (US)

(73) Assignee: California Institute of Technology, Pasadena, CA (US)

( * ) Notice: Subject to any disclaimer, the term of this patent is extended or adjusted under 35 U.S.C. 154(b) by 219 days.

(21) Appl. No.: 10/299,121

(22) Filed: Nov. 19, 2002

(65) Prior Publication Data

US 2003/0147142 A1 Aug. 7, 2003

Related U.S. Application Data

(60) Provisional application No. 60/332,709, filed on Nov. 20, 2001.

(51) Int. Cl.[7] .............................. H01S 3/08; G02B 27/10
(52) U.S. Cl. ........................ 372/100; 372/101; 359/618; 359/625; 359/626
(58) Field of Search ............................... 372/100, 101, 372/109, 24; 359/618, 625–626

(56) References Cited

U.S. PATENT DOCUMENTS

| | | | | |
|---|---|---|---|---|
| 5,107,369 A | * | 4/1992 | Hendrickson et al. | ...... 359/399 |
| 5,734,504 A | * | 3/1998 | Billman | ...................... 359/618 |
| 6,452,146 B1 | * | 9/2002 | Barchers | .................. 250/201.9 |

* cited by examiner

*Primary Examiner*—Don Wong
*Assistant Examiner*—James Menefee
(74) *Attorney, Agent, or Firm*—Daniel L. Dawes; Myers Dawes Andras & Sherman LLP

(57) ABSTRACT

An optical beacon is comprised of a telescope having a primary focal plane or Coudé focal plane, a plurality of fiber coupled laser sources for generating a plurality of beams, a collimator for collimating the plurality of beams, and optics for combining and focusing the plurality of collimated beams onto the primary or Coudé focal plane of the telescope. The telescope propagates the optical beacon, which is arranged into a ring of incoherent plurality of collimated beams. The apparatus further comprises fiber splitters coupled to each laser source to provide at least eight beams from at least four laser sources. The optics comprises a prism assembly, a combiner lens, a focusing lens and a field lens for focusing the plurality of collimated beams onto the primary focal plane or Coudé focal plane of the telescope.

26 Claims, 2 Drawing Sheets

METHOD AND APPARATUS FOR A MULTIBEAM BEACON LASER ASSEMBLY FOR OPTICAL COMMUNICATIONS

RELATED APPLICATIONS

The present application is related to U.S. Provisional Patent Application Ser. No. 60/332,709, filed on Nov. 20, 2001, which is incorporated herein by reference and to which priority is claimed pursuant to 35 USC 119.

The invention described herein was made in the performance of work under a NASA contract, and is subject to the provisions of Public Law 96-517 (35 USC 202) in which the Contractor has elected to retain title.

BACKGROUND OF THE INVENTION

1. Field of the Invention

The invention is related to the field of satellite tracking, and in particular to apparatus and methods of using multiple laser beams to generate optical beacons for low earth orbital satellite tracking of ground stations in optical communication with the satellite.

2. Description of the Prior Art

In order for a satellite to optically communicate with a ground station, it must be able to orient its antenna, which is often highly directional, toward the ground station. The ground station must therefore send up a directional beacon to the satellite on which the satellite can lock for orientation purposes.

Free space optical communications requires a beacon laser for acquisition and tracking of the ground station by the spacecraft terminal. However, a laser beam propagated through the atmosphere experiences scintillation and beam wander which breaks up the beam and causes signal fades at the receive system. This intermittent loss of signal breaks the tracking lock and requires reacquisition of the beacon laser source.

Uniform illumination of a distant object, such as a missile target, or a satellite ground station by a remote laser is prevented by the scintillation of the laser beam as it traverses the turbulent atmosphere to reach the target. The laser beam is essentially passed through a large number of randomly-oriented, time-varying prisms in the atmosphere which break the beam into many beamlets with slightly different directions. As these coherent (all having originated from a coherent wavefront of diameter D at the beam directing telescope) beamlets arrive at the target with random time-varying position, they interfere to provide a large variation of intensity with position on the target.

It has been speculated for some time that the use of many (say n) small mutually incoherent laser beams with diameter $\leq r_0$, where $r_0$ is the so-called "atmospheric coherence diameter" as defined by astrophysicist David Fried, separated spatially but originating within the same area $A = \Pi D^2/4$, where D was the diameter of the single, coherent beam at the projection telescope, would, if focused to the target, provide more uniform illumination than that of the single beam. For a complete discussion of the atmospheric coherence diameter, $r_0$, and other features of atmospheric turbulence and compensation, see Atmospheric-Compensation Technology, J.Opt.Soc.Am., (R. Benedict, Jr., J. Breckinridge, David Fried, Editors) A, Vol. 11, No. 1, January 1994.

Lucent, Astroterra, Terrabeam and MIT Lincoln Labs among others, are involved in free space optical communication for terrestrial applications. Astrorerra makes use of a four beam beacon laser assembly. Lincoln Lab has used multi-beam transmission from a single laser during active missile tracking disclosed in U.S. Pat. No. 5,734,504 discussed below. Thus, multi-beam laser tracking is known for satellite applications.

A multi-beam illuminator laser made by Lockheed Martin Corp. is shown in U.S. Pat. No. 5,734,504. The multi-beam illuminator laser is intended to provide a uniform laser beam illumination of a distant target or remote object, even in the presence of changing atmospheric conditions. A diameter-adjustable array provides a variable number of co-parallel, mutually incoherent, polarization-aligned, waist size- and position-adjustable beamlets. A beam divider uses input or source laser power and because of this may be driven by as few as one laser or by as many as n lasers, where n is equal to the beamlet number. Rapid adjustment of the beamlet number and beamlet positions in the field allows determination of the optimum number of beamlets to use. Finally, as the total number of beamlets and possibly their positions are varied, the individual beamlet powers are maintained equal to each other and the overall beamlet array power is easily held constant by choice of the stage angles within the beam divider.

BRIEF SUMMARY OF THE INVENTION

The invention is an apparatus for providing an optical beacon comprising a telescope having a primary focal plane, a plurality of fiber coupled laser sources for generating a plurality of beams, a collimator for collimating the plurality of beams, and optics for combining and focusing the plurality of collimated beams onto the primary focal plane of the telescope. The telescope propagates the optical beacon which is comprised of an incoherent plurality of collimated beams.

The plurality of beams is arranged into a ring of beams that can be varied individually to overlap in the far-field or corporately to be aligned through the telescope. The size and divergence of the ring of beams can be easily adjusted by varying the ring diameter or collimated beam spot size.

In the illustrated embodiment the telescope is a reflection telescope that includes a primary mirror, and the optics combines and focuses the plurality of collimated beams onto the primary mirror of the telescope.

The plurality of laser sources comprise at least four fiber coupled laser sources, preferably fiber coupled diode lasers, although other laser sources amendable to fiber coupling could be employed according to the teachings of the invention.

The apparatus further comprises a fiber splitter coupled to each laser source to provide at least eight beams.

The collimator comprises a separate collimator corresponding to each of the at least four laser sources or to each of the eight fiber coupled beams. The separate collimators are arranged and configured into a ring to project a ring of collimated beams into the telescope.

In the illustrated embodiment the telescope further comprises a Coudé mount defining a Coudé focal plane, wherein the optics combines the plurality of beams from the plurality of laser sources and focuses the plurality of beams onto the Coudé focal plane.

The optics comprises a combiner lens, a focusing lens and a field lens for focusing the plurality of collimated beams onto the primary focal plane or Coudé focal plane of the telescope.

While the invention and its embodiments have been described above in terms of optical elements or means for performing certain specified functions, it is also to be expressly understood that the invention comprises various embodiments of a method comprised of steps for performing the same functions.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

An optical beacon is comprised of a telescope having a primary focal plane or Coudé focal plane, a plurality of laser sources for generating a plurality of beams, a collimator for collimating the plurality of beams, and optics for combining and focusing the plurality of collimated beams onto the primary or Coudé focal plane of the telescope. The telescope propagates the optical beacon, which is arranged into a ring of incoherent plurality of collimated beams. The illustrated embodiment further comprises 50/50 fiber beam splitters coupled to each laser source to provide at least eight beams from the laser sources, though in principle n fiber outputs could be obtained from even a single laser source by appropriate fiber splitters. The optics comprises a combiner lens, a focusing lens and a field lens for focusing the plurality of collimated beams onto the primary focal plane or Coudé focal plane of the telescope.

The invention is directed to an apparatus and method of using four lasers 12 to generate an eight-beam beacon 10 in a ring to overcome loss of lock during low earth orbital satellite tracking of ground stations in optical communication with the satellite. The operability of the invention has been demonstrated using a 24" telescope representing the ground station and a JPL developed Optical Communication Demonstrator (OCD) located 45 km away representing the space borne receive terminal. The OCD is disclosed in U.S. Pat. No. 5,517,016 (1996), incorporated herein by reference.

Figure 1:
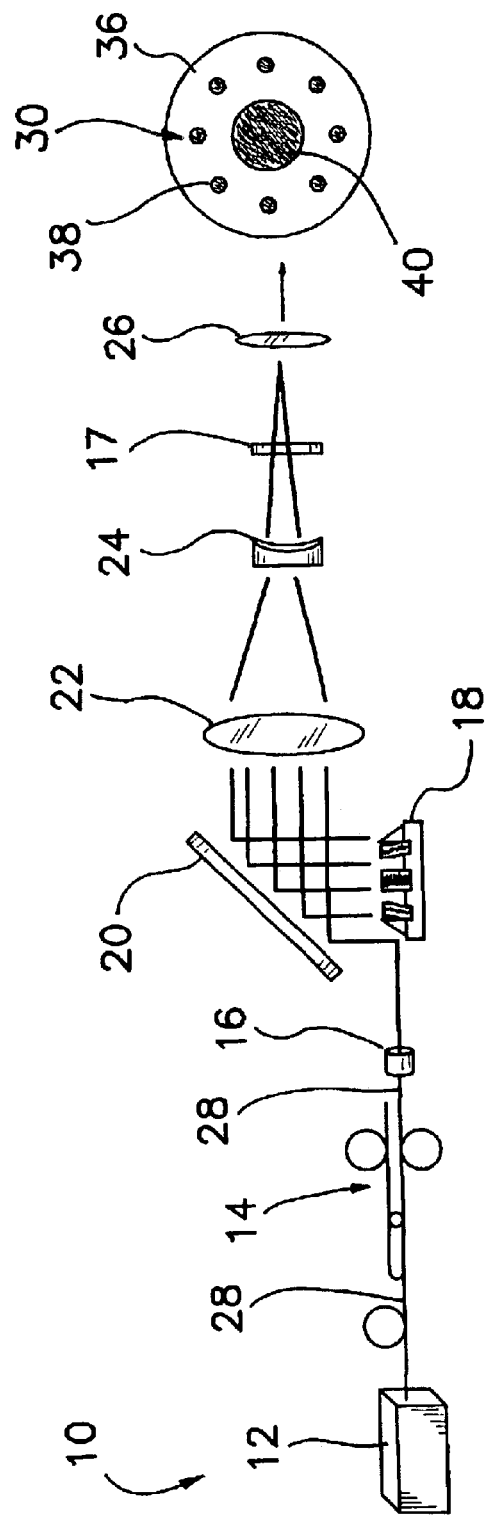
FIG. 1 is a simplified diagrammatic side view of the elements of the invention.
Figure 2:
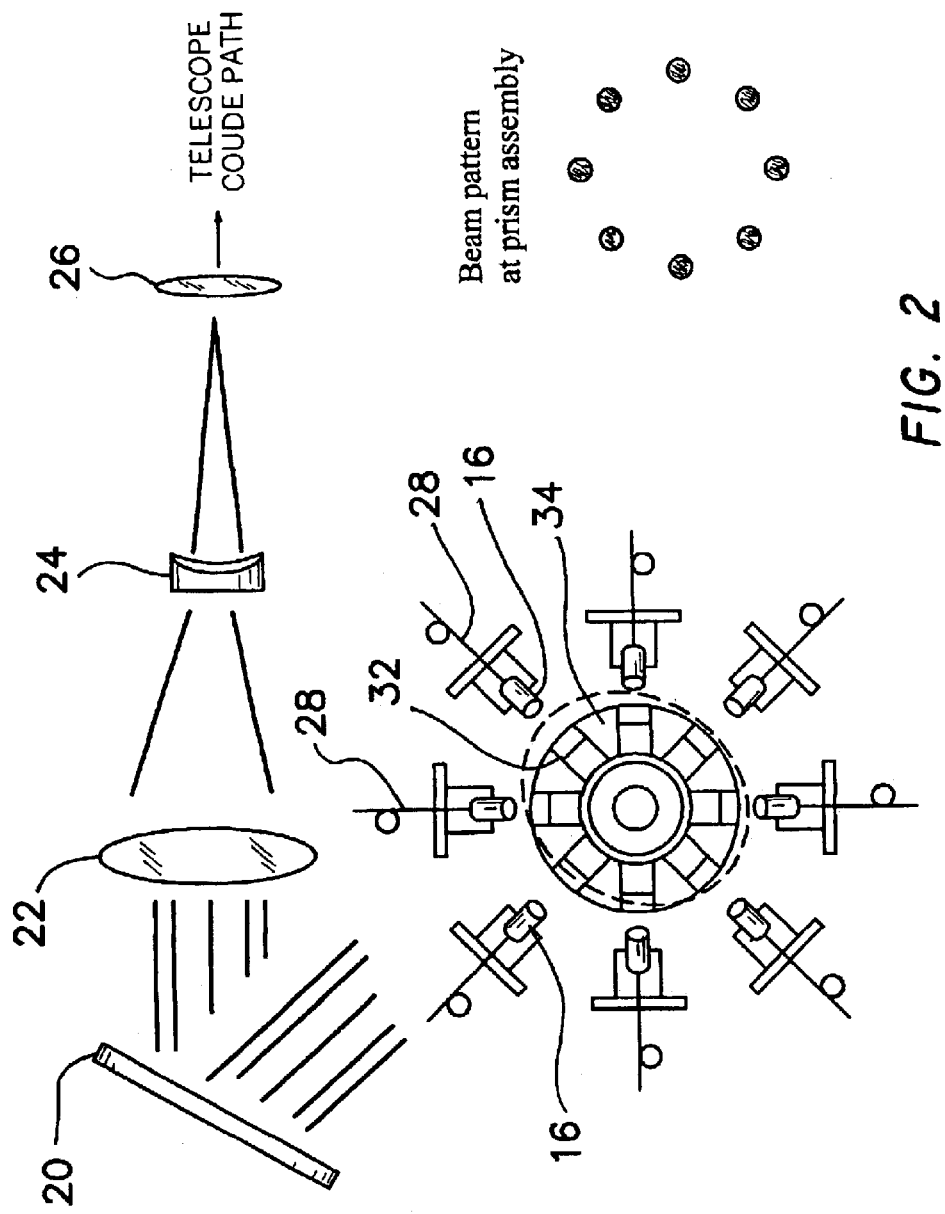
FIG. 2 is a simplified diagrammatic top plan view of the elements of the invention.

FIGS. 1 and 2 diagrammatically illustrate the elements of an eight-beam laser beacon, generally denoted by reference numeral 10, for low earth orbit satellite-to-earth optical communication. Currently a laser beacon is needed for optical communication, but the earth atmosphere generates intermittent loss of signal, which breaks tracking lock, which in turn requires reacquisition to reprovide the tracking lock. The primary reasons for this intermittent loss are atmospheric scintillation and beam wander. With multiple beams the power fluctuations from each beam are averaged out and the uniform field of illumination allows tracking without signal fades. Also, risks to eye safety are mitigated by multiple beam illuminators, since the power density per beam is lowered by the factor n when using n beams.

Scintillation effects can be reduced by using multiple incoherent beams as the beacon laser source when the aperture size of the receiver is limited as in a space-based optical communication terminal. In the far field, the power fluctuations from each beam are averaged out and allows tracking without signal fades. The reduction in scintillation scales as the number of beams propagated, saturating as a certain number is approached.

The invention is directed to a different approach from the prior art by using four fiber coupled lasers, each split into two beams. Also unlike the prior art cited above, the invention is independent of the polarization of the various beams. The multiple beams are arranged into a circular aperture using a prism beam combiner. As a result of these features, both each beam and the collection of all the beams can each be independently aligned with ease. As will become apparent in the following description each of the beams are independently adjustable in regard to the required divergence and telescope focal length. While the illustrated embodiment is described in terms of an earth-orbit satellite, the invention also is applicable to deep space communications. Since space-to-ground laser communications is still a technology under development, established methods for ground station beacons do not exist. The invention provides an easy, practical means of coupling relatively low power lasers to a ground telescope to provide an optical beacon which aids the pointing or orientation of near earth-orbiting spacecraft back to the ground station. Multiple low power beams add up in the far-field to provide the necessary power required by the satellite link. The greatest advantage for a ground based beacon, however, is the mitigation of irradiance fluctuations induced by atmospheric turbulence. Even though in the current implementation, the illustrated embodiment uses eight beams, the invention is scalable to a larger number of beams. The design also allows flexibility in tailoring individual beam divergence, which is advantageous for low-earth orbiting satellites, which often have a large uncertainty in position that needs to be covered by spatial extent of the beacon uplinked to the satellite. The design also allows co-aligning of each beam with respect to the others to ensure beam overlap and the ability to easily steer the overall beam pattern through the telescope. Yet another advantage is that by having the overall beacon power distributed among multiple beams, the uplink power density per beam throughput from the ground telescope can be N times lower. Thus for a given damage threshold power density, for elements in the telescope optical train, utilizing N beams allows transmitting nearly N-times more overall power thereby extending the range for servicing deep space spacecrafts that are trying to optically communicate with Earth receiving stations. Here the beams are spatially separated through the telescope optics and may accommodate high energy pulses. The beacon laser assembly 10 of FIGS. 1 and 2 is comprised of a fiber coupled 780 nm laser diodes 12, 50/50 multimode fiber splitters 14, optical prisms 18 mounted in a ring configuration followed by an optical lens train 22, 24, 26. A schematic is shown in FIG. 1. The wavelength for the laser diodes 12 was chosen to be compatible with the JPL developed Optical Communication Demonstrator terminal design where the receive path optical coatings and narrow bandpass filters were optimized for a wavelength of 780 nm. The diode lasers 12 were multi-mode fiber coupled to maximize the continuous wave output power although single mode fiber could also be used to improve the beam quality with only a slight reduction in power. Each fiber output 28 was then connected to a 50/50 multi mode fiber splitter 14 with minimal insertion loss to provide eight sources of nominally 10 mW each. Multimode fiber coupled laser sources 28 were used due to their being readily available and provide larger power margins. The design would be better suited to use single mode fiber coupled laser sources although the power margin is much reduced.

The multi-beam beacon laser is comprised of the output of four fiber coupled laser diodes 12, which have their output split into eight beams through 50/50 multimode fiber couplers 14. Each coupler 14 splits its corresponding beam into two beams. FIG. 1 show one such diode 12 operating at 780 nm and 30 mW coupled to a 50/50 multimode fiber coupler 14 having a 62.5 μm core. Only one of the two beams derived from laser diode 12 is shown. Each coupler 14 is connected to two collimators 16 (one of which is shown in FIG. 1), which in the illustrated embodiment has an effective focal length of 11 mm. The collimated output beams are radially incident on a prism assembly 18 to form a ring of eight beams, which is then imaged onto the primary mirror 36 of a 24" reflecting telescope. The eight beams 38 are shown arranged in a ring on primary mirror 36 around a central obscuration 40 due to the secondary mirror (not shown) of telescope 30. Other size and design telescopes can be substituted as equivalently following well known optical considerations. The image of the ring of beams was transmitted to a folding mirror 20 and then combined through a combiner lens 22 with an effective focal length of 355 mm, focused by a lens 24 with an effective focal length of −52 mm and then directed by a field lens 26 at the Coudé focus of the telescope 30. In this manner each of the collimated beams are brought into or focused onto a single transmitted image on the focal plane of the transmitting telescope 30. Moreover this design provides a pupil plane with the ring of eight lasers. If active closed loop tracking of a satellite were required, a steering mirror could be placed at the pupil plane and all eight co-aligned beams could be steered in order to maximize received signal at the target.

To enable the outputs to be imaged as a ring on the primary telescope mirror 20 with fine position and tip/tilt control of each beam, each fiber 28 was arranged radially to be pointed at a coated right angle prism 32 mounted on an adjustable diameter plate 34 as shown in top plan view in FIG. 2. Collimator 16 of focal length 11 mm was mated to each fiber 28 to give a fixed beam diameter. The focal length was chosen to provide the required spot size and hence divergence of the propagated beam given that the multimode fiber core was 62.5 micrometer in diameter and that the focal length of telescope 30 was around 25 m. Due to the multimode fiber 28, the beam did not uniformly fill the entire core diameter but varied spatially and temporally in the fiber core. The actual beam diameter was empirically measured to derive the correct imaging lens train prescription. The ring of eight beams was then focused through a combiner lens 22 and negative doublet lens 24 to match the focal length of telescope 30.

Finally a field lens 26 was placed at the focal point of telescope 30 to relay the image to the primary mirror position 36. By placing variable neutral density (ND) filters 17 in the optical path of one or several beams, between folding mirror 20 and lens 22the power in each beam could be adjusted to take out any nonuniformities in the laser output powers. The ND filters 17 could either be configured so that each beam attenuation can be controlled separately or all the beams could share a single variable ND filter 17. As a diagnostic that allows real time monitoring of the multibeam output a pellicle beam splitter (not shown) can be placed after lens 22 so that a small portion of the outgoing beacon is then focused with identical lenses on a CCD camera (not shown). The CCD image then would be indicative of the extent to which the alignment of the spots at the Coudé focus is maintained during operations. The neutral density filters 17 could be placed in a collimated portion of the beam i.e. between prism assembly 18 and mirror 20 or lenses 20 and 22. Alignment of the individual beams and the overall beam pattern is important in obtaining the desired position on primary mirror 36 without vignetting through the Coudé path of telescope 30 and obtaining overlap of each beam in the far field.

The divergence of each beam was designed in the illustrated embodiment to be 50 microradians for the full width half maximum (FWHM) energy diameter of each beam given a FWHM spot size of approximately 17 mm. Estimates of the beam diameter were taken from beam profiles of the output imaged onto the telescope dome and gave close to this value on average. The output power from the telescope 30 was estimated to be 1–2 mW per beam to maintain eye-safe transmission levels and sufficient power on the received side.

The beacon laser assembly 10 was successfully deployed in the field with horizontal propagation to a receiver system at a distance of 46 km. The measured scintillation strength or Rytov variance through the zenith equivalence of four atmospheric masses was reduced consistent with theoretical estimates. Preliminary results showed that with a single beam, the scintillation index was in the range of 0.8 to 1.3, depending on the atmospheric conditions. However, a best case simulated scintillation index of 0.2 to 0.55 was obtained with the eight beams together, depending an the overlap of the beams in the far field and the turbulence of the atmosphere during the measurement process.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be, understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An apparatus for providing an optical beacon comprising:
   a telescope having a primary focal plane;
   a plurality of fiber coupled, independently adjustable laser sources for generating a plurality of mutually incoherent beams;
   a plurality of independently adjustable collimators for collimating the plurality of beams which are independently alignable independent of polarization; and
   optics for collectively combining and focusing the plurality of collimated beams onto the primary focal plane of the telescope, wherein the telescope propagates the optical beacon comprised of an incoherent plurality of collimated beams.

2. The apparatus of claim 1 further comprising a prism assembly of a plurality of prisms, each with easily variable spot size and ring diameter wherein the plurality of beams are individually arranged into a collective ring of beams by the prism assembly.

3. The apparatus of claim 1 wherein the telescope is a reflection telescope which includes a primary mirror, and wherein the optics collectively combines and focuses the plurality of collimated beams onto the primary mirror of the telescope.

4. The apparatus of claim 1 wherein the plurality of laser sources comprise at least four multi-mode fiber coupled laser sources.

5. The apparatus of claim 4 wherein the plurality of laser sources comprise at least four multi-mode fiber coupled diode lasers.

6. The apparatus of claim 4 further comprising a 50/50 fiber splitter coupled to each laser source to provide at least eight beams.

7. The apparatus of claim 6 wherein the plurality of collimators comprise a separate collimator corresponding to each of the at least four fiber coupled laser sources, and where the separate collimators are arranged and configured into a ring by an optical prism assembly to project a collective ring of collimated beams into the telescope.

8. The apparatus of claim 1 wherein the telescope further comprises a Coud mount defining a Coud focal plane, and wherein the optics collectively combines the plurality of beams from the plurality of laser sources and collectively focuses the plurality of beams onto the Coud focal plane.

9. The apparatus of claim 8 wherein the optics comprises a combiner lens, a focusing lens and a field lens for collectively focusing the plurality of collimated beams onto the Coud focal plane.

10. The apparatus of claim 1 wherein the optics comprises a combiner lens, a focusing lens and a field lens for collectively focusing the plurality of collimated beams onto the primary focal plane of the telescope.

11. The apparatus of claim 1 where the plurality of beams are arranged and configured to conform to a circular telescopic aperture.

12. The apparatus of claim 11 where the optics comprises a prism beam combiner.

13. The apparatus of claim 1 where the plurality of beams are characterized by independent polarization states.

14. The apparatus of claim 1 where the plurality of beams is collectively alignable.

15. The apparatus of claim 1 where the plurality of beams is collectively alignable.

16. The apparatus of claim 1 where each one of the plurality of beams is separately adjustable for divergence and telescopic focal length.

17. A method for providing an optical beacon comprising:
   generating a plurality of independently adjustable, mutually incoherent laser beams emitted from optical fibers;
   independently collimating the plurality of beams;
   aligning the plurality of beams individually as necessary, which beams are independently alignable independent of polarization;
   collectively combining and focusing the plurality of collimated beams onto a primary focal plane of a telescope; and
   propagating the optical beacon comprised of an incoherent plurality of collimated beams.

18. The method of claim 17 further comprising individually arranging the plurality of beams into a collective ring of beams by an optical prism assembly.

19. The method of claim 17 wherein the telescope is a reflection telescope which includes a primary mirror, and wherein combining and focusing the plurality of collimated beams collectively combines and focuses the plurality of collimated beams onto the primary mirror of the telescope.

20. The method of claim 17 wherein generating the plurality of laser beams comprises generating at least four laser beams.

21. The method of claim 20 wherein generating at least four laser beams comprises generating at least four laser beams in a corresponding fiber coupled laser diode.

22. The method of claim 20 further comprising splitting each generated beam to provide at least eight beams.

23. The method of claim 22 wherein collimating the plurality of beams comprises separately collimating each of the at least four laser sources, and collectively forming a ring of collimated beams for propagation into the telescope by an optical prism assembly.

24. The method of claim 17 wherein the telescope further comprises a Coud mount defining a Coud focal plane, and wherein collectively combining and focusing the plurality of collimated beams collectively combines and collectively focuses the plurality of beams onto the Coud focal plane.

25. The method of claim 24 wherein collectively combining and focusing the plurality of collimated beams comprises using a combiner lens, a focusing lens and a field lens for collectively focusing the plurality of collimated beams onto the Coud focal plane.

26. The method of claim 17 wherein collectively combining and focusing the plurality of collimated beams utilizes an optical prescription to match the focal length of the telescope.

* * * * *

UNITED STATES PATENT AND TRADEMARK OFFICE
CERTIFICATE OF CORRECTION

PATENT NO. : 6,922,430 B2
DATED : July 26, 2005
INVENTOR(S) : Abhijit Biswas et al.

It is certified that error appears in the above-identified patent and that said Letters Patent is hereby corrected as shown below:

<u>Title page,</u>
Item [75], Inventors, delete "Babak Sanji" and insert -- Babak Sanii --.

Signed and Sealed this

Twenty-third Day of May, 2006

JON W. DUDAS
*Director of the United States Patent and Trademark Office*